July 9, 1968
D. E. ROYAL
3,392,391
DIRECTION-FINDING SYSTEM
Filed Dec. 19, 1966
3 Sheets-Sheet 1
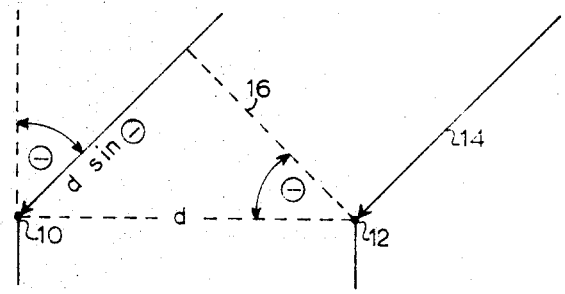
FIG. 1
FIG. 2
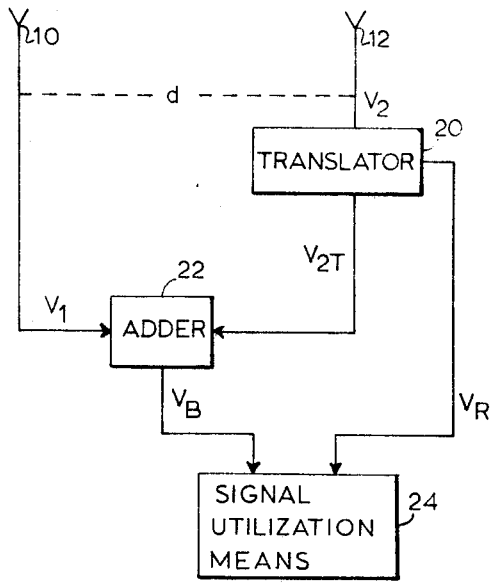
FIG. 3
(a) TRANSLATING SIGNAL
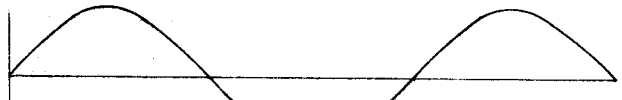
(b) INTERFERENCE ENVELOPE ($\Theta = 0°$)
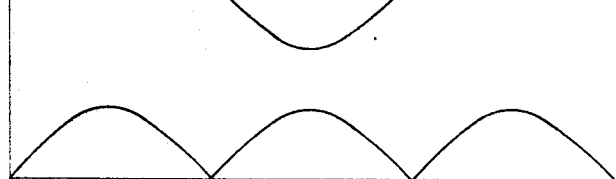
(c) ($\Theta \neq 0°$)
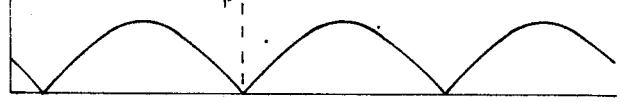
*INVENTOR.*
DOUGLAS E. ROYAL
BY Arthur Freilich
ATTORNEYS

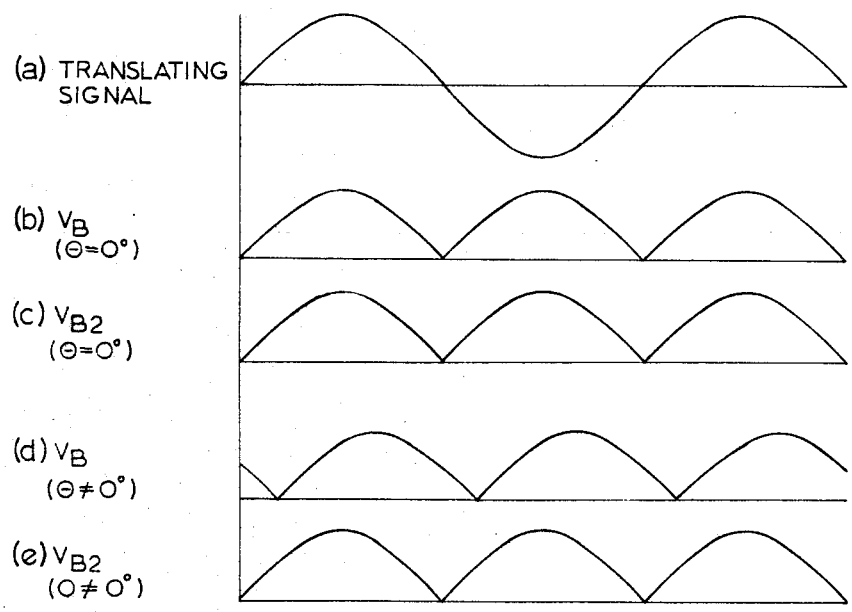
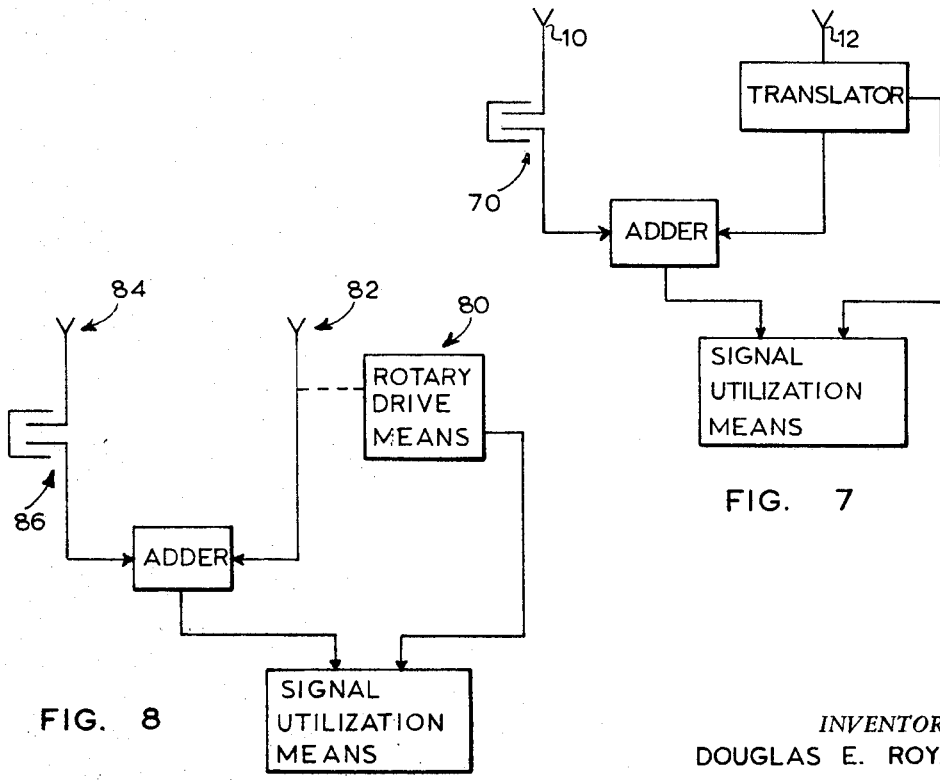

United States Patent Office 3,392,391
Patented July 9, 1968

3,392,391
DIRECTION-FINDING SYSTEM
Douglas E. Royal, Playa Del Rey, Calif., assignor to TRW Inc., Redondo Beach, Calif., a corporation of Ohio
Filed Dec. 19, 1966, Ser. No. 602,866
15 Claims. (Cl. 343—113)

ABSTRACT OF THE DISCLOSURE

This invention discloses a technique for using a pair of antennas to determine the bearing angle of an unknown source of electromagnetic radiation. The signal from one antenna is unidirectionally translated to thereby develop a single translated signal which is combined in an adder with the signal from the other antenna. The output of the adder when phase compared with a reference signal from the translator produces an output that is related to the bearing angle of the received radiation.

---

This invention relates generally to direction-finding apparatus useful for determining the direction therefrom of a source of radiant energy.

Many applications exist in which it is necessary to determine the location of a remote source of radiant energy, such as a radio frequency transmitter. As is well known in the art, the position of such a source can be determined by ascertaining its direction from a pair of known positions. In order to do this of course, it is necessary to employ a direction-finding apparatus at each of those known positions. Many different direction-finding systems are known in the prior art which are capable of performing this function. For example, in one embodiment disclosed in U.S. Patent 3,246,331, a pair of spaced antennas are employed having phase shift characteristics which make it possible, by physically rotating one antenna with respect to the other, to increase the phase difference between the signals received at the two antennas until the two signals are completely out of phase and cancel one another. Since the initial phase difference between the two signals is related to the angle of arrival (bearing angle) of the radiant energy, the angle through which the one antenna must be rotated to produce the output null is also related to that bearing angle. Thus, the antenna displacement provides the desired bearing angle information.

Although a system as disclosed in the cited patent is very satisfactory in many applications, it is unsuitable in other applications, as for example where it is desired to employ no moving parts. Accordingly, it is an object of the present invention to provide a direction-finding system which requires no moving parts. As will be seen hereinafter, moving parts can be eliminated by electronically simulating mechanical scanning.

Although the utilization of electronic scanning, in lieu of mechanical scanning, introduces many advantages, it also introduces certain problems. Most noticeably, the electronic scanning equipment requires the utilization of nonlinear active circuit elements which can significantly reduce the accuracy of the bearing angle measurements. A significant feature of the present invention constitutes the provision of calibration means for yielding bearing angle measurements whose accuracy is not affected by the nonlinearities of the scanning equipment.

In many applications, it is desirable to use direction-finding systems for both acquisition and tracking. In an acquisition mode, it is important that the system very rapidly provide bearing angle measurements throughout the entire spatial coverage of the antennas employed. Imprecise bearing angle measurements can usually be tolerated for the purpose of acquisition. However, for tracking, it is necessary that very precise bearing angle information be provided in a specified portion of the entire spatial coverage. For tracking purposes, a slower response can usually be tolerated. In view of the foregoing, it is an additional object of the present invention to provide a direction-finding system capable of operating in both an acquisition and tracking mode. Moreover, a significant feature of an embodiment of the invention is that it can operate in both modes simultaneously.

Briefly, the present invention is based on the recognition that bearing angle information can be obtained by translating the signal received by a first of two spaced antennas prior to adding it to the signal received by a second of the antennas. The wave interference of this sum signal will have an envelope periodicity equal to that of the translating signal and the timing or phasing of this periodicity relative to the timing of the translating signal will yield bearing angle information.

In a preferred embodiment of the invention, in order to avoid inaccuracies resulting from the nonlinear characteristics of the translating equipment, a calibrated variable delay circuit branch is introduced into the basic configuration. For example, the output of the delay circuit can be added to the translated signal to develop a second wave interference envelope. By varying the delay, the second envelope can be shifted into coincidence with the first envelope. As will be seen hereinafter, the amount of delay which must be introduced to bring the two envelopes into coincidence constitutes a measure of the bearing angle which is not affected by nonlinearities in the translating equipment.

The novel features that are considered characteristic of this invention are set forth with particularity in the appended claims. The invention will best be understood from the following description when read in connection with the accompanying drawings, in which:

FIGURE 1 is a schematic diagram generally illustrating the geometric relationship between antennas employed in accordance with the present invention and radiant energy whose bearing angle is to be determined;

FIGURE 2 is a block diagram illustrating a basic embodiment of the present invention;

FIGURE 3 illustrates waveforms provided by the apparatus of FIGURE 2 for determining the bearing angle of radiant energy;

FIGURE 6 illustrates waveforms of signals provided by the apparatus of FIGURE 5;

FIGURE 7 is a block diagram of another embodiment of the invention; and

FIGURE 8 is a block diagram of still another embodiment of the invention.

Figure 4:
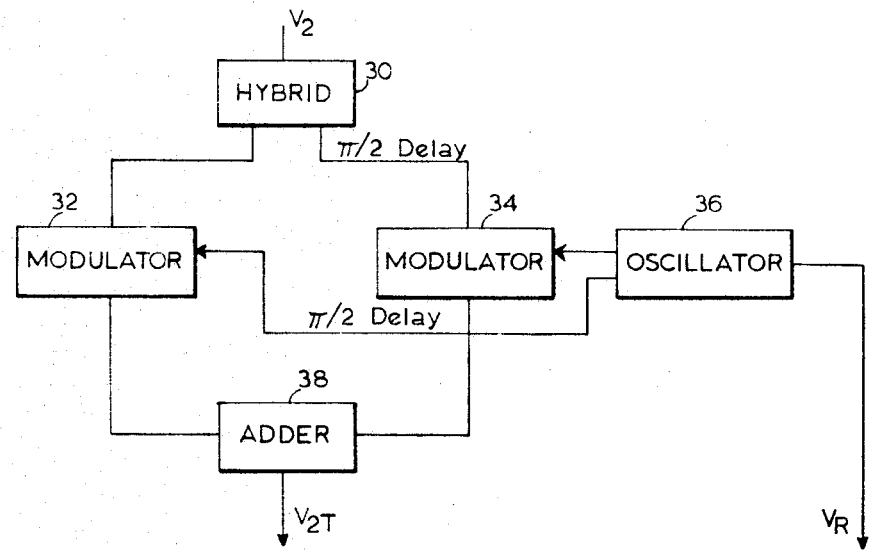
FIGURE 4 is a block diagram of a typical translator which can be employed in the apparatus of FIGURE 2.

Attention is now called to FIGURE 1 which schematically illustrates a first antenna 10 and a second antenna 12 spaced from each other by a distance $d$. The known individual characteristics of the antennas 10 and 12 are important to the proper operation of the present invention. As will be seen hereinafter, the antennas 10 and 12 comprise part of a direction-finding system for determining the direction therefrom of the source (not shown) of radiant energy 14. More particularly, the direction-finding apparatus to be specifically discussed herein is intended to quantitatively determine the bearing angle $\theta$ illustrated in FIGURE 1.

Prior to considering the details of a direction-finding apparatus in accordance with the invention, FIGURE 1 will be discussed in order to generally demonstrate the theory of operation. It should be apparent from FIGURE 1 that if the angle $\theta$ is 0°, i.e. the source of radiant energy is directly forward of the antennas 10 and 12, then the radiant energy wavefront 16 will arrive at the antennas 10 and 12 simultaneously. However, if the bearing angle $\theta$ is not equal to 0°, the signal received by one of the antennas will lead the signal received by the other antenna. For example, in FIGURE 1 the signal output of antenna 12 will lead the signal output of antenna 10. It should be apparent from FIGURE 1 that the amount of phase difference between the signals received at antennas 10 and 12 will be dependent upon the distance $d \sin \theta$. The time interval between the arrival of the signal energy 14 at antennas 10 and 12 is of course equal to $$d \sin \theta / c \quad (1)$$

where $c$ represents the velocity of the energy 14. If the frequency of the energy 14 is represented by $f$, then the period is equal to $1/f$. Thus, the fraction of a period between the signals received at antennas 10 and 12 is represented by $$\frac{\text{Time}}{\text{Period}} = \frac{(d \sin \theta)/c}{1/f} \quad (2)$$

Since one period of course corresponds to $2\pi$ radians, this fraction can be expressed in radians as $$2\pi f d \sin \theta / c = \phi \quad (3)$$

Accordingly, from the foregoing, if the frequency $f$ is known, it should be apparent that by determining the phase difference $\phi$ between the signals received by antennas 10 and 12, the bearing angle $\theta$ can also be determined. The apparatus in accordance with the present invention is capable of precisely determining the phase difference $\phi$.

Briefly, the phase difference $\phi$ is determined by varying the phase of the signal received by one of the antennas as a function of time and adding it to the signal received by the other of the antennas. The amount of phase variation which must be introduced in order for the signals to cancel, i.e. the sum to be zero, of course represents the phase difference $\phi$ attributable to the bearing angle $\theta$. The aforecited Patent 3,246,331 discloses a system in which the phase of one of the signals is varied by physically rotating the antenna receiving that signal. Inasmuch as the rotation period more or less represents the minimum time in which a bearing angle measurement can be obtained on a signal and since a typical period is 50 milliseconds, it should be apparent that the mechanical system cannot provide a very fast response. In addition, the relatively high rotation rates (i.e. for a mechanical system) normally required by the signal environment are disadvantageous where the system is used at low frequencies and/or when certain space vehicle applications are involved.

In order to operate at considerably higher rates, FIGURE 2 illustrates a system in which the mechanical rotation of an antenna is eliminated. More particularly, in lieu of employing rotatable antennas, the antennas 10 and 12 of FIGURE 2 are stationary. Mechanical rotation is effectively simulated by electronically varying the phase, as a function of time, of the signals received by one of the antennas. As a consequence, bearing angle determinations can be made much more rapidly; for example, a bearing angle measurement can be made on a single radar pulse by simulating a rotation period of the antenna shorter than the pulse duration.

In order to electronically vary the phase of the signal received by one of the antennas as a function of time, a frequency translator 20 is employed. The output signal $V_2$ provided by antenna 12 is connected to the input of the translator 20. The translated output signal $V_{2T}$ provided by the translator is applied to one input of an adder circuit 22. The output signal $V_1$ from the other antenna 10 is also provided to the input of the adder circuit 22. The adder circuit 22 sums the signals $V_1$ and $V_{2T}$ and develops a sum output signal $V_B$ which is applied to a signal utilization means 24. In addition, a reference signal $V_R$ related to a translating signal to be discussed, is applied to the signal utilization means 24 by the translator 20.

The frequency of the signals $V_1$ and $V_2$ is very high compared to the frequency of the translating signal. For example, the signals $V_1$ and $V_2$ may typically have a frequency of 500 megacycles. The translating signal typically may have a frequency of twenty cycles per second so that $V_{2T}$ will, for example, have a frequency of 500,000,020 cycles per second. As is well known, two signals displaying a frequency difference will cyclically interfere when added such that the envelope of the wave interference will have a periodicity determined by that of the translating signal. The timing (or phasing) of this periodicity relative to the timing of the translating signal will of course be related to the phase difference between the added signals. In this manner, the phase difference $\phi$ and consquently the bearing angle $\theta$ can be determined.

In order to more clearly demonstrate this, attention is called to the waveforms of FIGURE 3. Line (a) illustrates the low frequency translating signal $V_R$. If the signals $V_1$ and $V_2$ are in phase (i.e. bearing angle $\theta = 0°$), then the envelope of the sum signal $V_B$ will be as illustrated in FIGURE 3(b). That is, the null points or cusps will coincide with the zero crossover points (pulses $V_R$) of the translating signal. If however the bearing angle $\theta$ is not equal to zero, then the envelope of the signal $V_B$ may be as illustrated in FIGURE 3(c). That is, the null points are shifted with respect to the zero crossover points of the translating signal. This amount of this shift is of course dependent upon the difference in phase between the signals $V_1$ and $V_2$. Accordingly, it should be appreciated from Equation 3, previously set forth, that by ascertaining the difference $\phi$, the bearing angle $\theta$ can be determined.

Inasmuch as suitable signal utilization means 24 are well known in the art, a detailed embodiment thereof will not be disclosed herein. Suffice it to say that the signal utilization means 24 should include means for extracting the envelope of the signal $V_B$. Accordingly, the signal utilization means 24 should include a detector and an appropriate number of amplifier stages. In addition, the signal utilization means 24 can include means for quantitatively determining the value of $\phi$ together with data processing means for determining the bearing angle $\theta$. Alternatively, the quantity $\phi$ can be determined by an operator utilizing an oscilloscope. For example, the reference pulses $V_R$ provided by the translator 20 can be employed to initiate a horizontal sweep such that the quantity $\phi$ can be easily determined.

Although various devices are known in the art which can be employed as the translator 20, a typical translator is illustrated in FIGURE 4 in which the signals $V_2$, $V_{2T}$ and $V_R$ have been identified for ready correlation with FIGURE 2. The translator is comprised of a hybrid junction 30 which couples the signal $V_2$ directly to modulator 32. In addition, the hybrid junction 30 delays the signal $V_2$ by 90° and couples it to the modulator 34. Modulating oscillator 36 provides the translating signal directly to modulator 34 and shifted by 90° to modulator 32. In addition, the oscillator 36 provides the reference signal $V_R$. The outputs of modulators 32 and 34 are applied to an adder circuit 38 which provides the translated signal $V_{2T}$.

The operation of the translator of FIGURE 4 is as follows: Assume that the transfer characteristics of the modulators are linearly dependent on the magnitudes of their modulating voltages. Then if a signal $$V_2 = V_s \sin \omega_s t$$

is supplied to the hybrid junction, the signal into modulator 32 is $$K_1 V_s \sin \omega_s t$$

Its modulating signal is $$V_m \cos \omega_m t$$

and its output signal is $$K_1 K_2 V_m V_s \sin \omega_s t \cos \omega_m t$$

The signal into moduator 34 is $$K_1 V_s \cos \omega_s t$$
$$V_1 V_s \cos \omega_s t$$

its modulating signal is $$V_m \sin \omega_m t$$

and its output signal is $$K_1 K_2 V_m V_s \cos \omega_s t \sin \omega_m t$$

The sum of the outputs of the two moduators is then $$K_1 K_2 K_3 V_m V_s \sin (\omega_s + \omega_m) t$$

and this is the output of the adder 38. This simplified explanation assumes transmission line lengths have been properly controlled, etc. The product $$K_1 K_2 K_3 V_m \approx 1$$

Utilizing a translator as shown in FIGURE 4, the embodiment of FIGURE 2 is able to very rapidly provide bearing angle determinations and, as mentioned, can in fact provide a bearing angle measurement with respect to a single radar pulse. The only significant disadvantage of utilizing an electronic translator as depicted in the embodiment of FIGURE 2 relative to a mechanical rotation system described in the cited patent, is that electronic translators require the use of nonlinear, active circuit elements which can significantly reduce the accuracy of the bearing angle measurements as compared to the accuracy obtainable by mechanical systems. These nonlinearities can to an extent be compensated for by appropriate waveshaping. For example, departures from linearity of the transfer characteristics of the modulators 32 and 34 can be compensated for by shaping the modulating waveform provided by oscillator 36. Such compensation is important in the embodiment of FIGURE 2 because the relationship of the bearing angle $\theta$ to the phase shift $\phi$ expressed in Equation 3 presupposes a number of things including the important assumption that the transator produces a uniformly increasing (or decreasing) change in phase as a function of time between the signals present at its input and output terminals. In actual fact, state of the art translators only approximate this behavior and as a consequence can give rise to significant inaccuracies in the bearing ange $\theta$. As noted, although these inaccuracies due to nonlinearities can be calibrated out to an extent, they cannot realistically be eliminated because of the signal dependent behavior of the nonlinear circuit elements contained in the translator. In order to avoid the effect of these nonlinearities, the preferred embodiment of the invention as illustrated in FIGURE 5 can be utilized.

Figure 5:
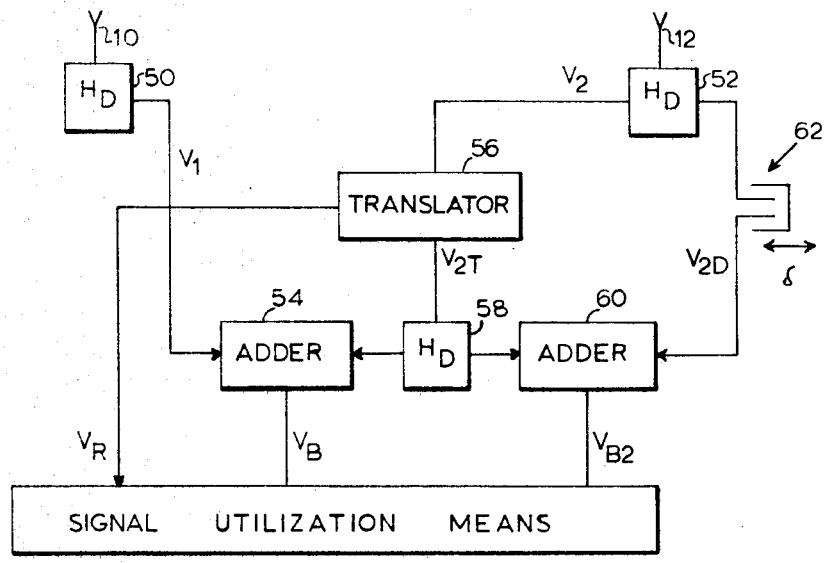
FIGURE 5 is a block diagram of a preferred embodiment of the invention.

More particularly, in FIGURE 5 the output signals provided by the antennas 10 and 12 are respectively coupled to distribution hybrid junctions 50 and 52. One output of the hybrid junction 50 is connected to the input of an adder circuit 54.

One output of the hybrid junction 52 is connected to the input of translator 56 which provides a translated output signal $V_{2T}$ to the distribution junction 58. One output of the junction 58 is connected to the adder 54. A second output of the junction 58 is connected to the input of an adder 60. A second output of the hybrid distribution junction 52 is connected through a circuit branch containing a calibrated delay means such as a line stretcher 62 to the second input of the adder 60.

As will be appreciated, it is important that the path delays between the reference plane of the distribution hybrid 58 and the reference planes of the adder circuits 54 and 60 be identical. Furthermore, it is important that the path delay between antenna 10 and the reference plane of adder 54 be equal to the path delay between antenna 12 and the reference plane of adder circuit 60 via the circuit branch which contains the calibrated line stretcher when the stretcher is at its reference position, i.e. $\delta = 0$. It is assumed that the antennas are identical.

The adder circuit 54 will function identically to the adder circuit 22 of FIGURE 2. That is, the envelope of the sum signal $V_B$ developed thereby will contain, in its phasing relative to the reference pulse $V_R$, the bearing angle information. However, as has been pointed out, this information will be inaccurate due to the nonlinearities introduced by the translator 56. More particularly, the phase shift introduced by the translator 56 will not be a linear function of time and consequently the measured shift will not precisely represent the additional time interval required by the radiant energy 14 to arrive at antenna 10 after it arrives at antenna 12.

In order to avoid the nonlinearities introduced by the translator 56, the variable delay means or line stretcher 62 is employed. The output $V_{B2}$ of the adder 60 represents the sum of the translated signal $V_{2T}$ and the delayed signal $V_{2D}$. The line stretcher 62 can be employed to cause the envelope of the signal $V_{B2}$ to coincide with the envelope of the signal $V_B$. The amount of line stretching or delay which must be introduced by the line stretcher 62 to bring the envelopes of the signals $V_B$ and $V_{B2}$ into coincidence represents a measure of the additional time interval it takes for the energy 14 to reach antenna 10. In other words, by adjusting line stretcher 62 to bring the signals $V_B$ and $V_{B2}$ into coincidence, the line stretcher 62 is introducing a delay equal to the time it takes the energy 14 to traverse the distance $d \sin \theta$.

In order to more clearly demonstrate the operation of the embodiment of FIGURE 5, attention is called to FIGURE 6 which in line (a) illustrates the translating signal. Line (b) illustrates the envelope of the signal $V_B$ assuming that the signal energy 14 arrives from an angle $\theta = 0°$. If $\theta = 0°$ and the line stretcher 62 is in its zero position, then the envelope of signal $V_{B2}$ [line (c)] will coincide with the envelope of signal $V_B$ and both will define cusps coinciding with the zero crossover points of the translating signal.

Now assume that th esignal energy 14 arrives from an angle $\theta$ not equal to zero. Consequently, the signal received by antenna 12 will lead the signal received by antenna 10 by a time advance $d \sin \theta/c$. The envelopes of the signals $V_B$ and $V_{B2}$ as shown in lines (d) and (e) respectively will now depart from time coincidence (by the amount $2\pi f d \sin \theta$, if the translator happen to be without error). As previously noted, the envelope shown in lines (d) and (e) can be brought into time coincidence by changing the position of the calibrated line stretcher by the amount $\delta/2V = d \sin \theta/c$ where V is the phase velocity of the signal in the line stretcher. Therefore, in the general case, $\sin \theta = \delta c/2dV$. Inasmuch as $c/2dV$ is constant, it should be clear that the bearing angle $\theta$ can be determined independent of the frequency of the energy 14 and independent of any knowledge concerning the actual behavior of the translator. Thus, the bearing angle can be determined with a precision dependent only upon that which is built into the calibrated line stretcher. Such line stretchers are readily known in the art.

From what has been said thus far, the dual mode nature of the system of FIGURE 5 should now be apparent. More particularly, the timing of the envelope of the signal $V_B$ with respect to the translating signal plus the knowledge of the theoretical behavior of the translator versus time very rapidly provides a bearing angle measurement throughout the entire spatial coverage of the antennas used in the system. This bearing angle information is typically inaccurate but is nevertheless very useful for acquisition purposes. When a precise bearing angle determination is required, as for tracking purposes, the calibrated line stretcher is adjusted until the envelopes of the signals $V_B$ and $V_{B2}$ coincide. Then the accurate bearing angle determination is derived from the line stretcher adjustment required to cause time coincidence between the envelopes.

It has thus far been assumed that the line stretcher 62 is operated manually. However, it should be appreciated that different system applications may dictate that the line stretcher be caused to cycle between predetermined limits at a reasonably slow rate or by servo loop driven to establish coincidence of the envelopes.

The embodiment of FIGURE 5, in addition to providing a dual mode of operation, also enables the frequency of the signal 14 to be determined. If, from that position of the line stretcher which causes time coincidence of the two signal envelopes, a further unidirectional movement is imparted to the line stretcher, the envelopes will depart from time coincidence and subsequently return to time coincidence. The additional movement of the line stretcher $\delta$ is equal to $2V/f$. This relationship can therefore be employed to determine the frequency of the signal 14.

Although the embodiments of the invention thus far discussed herein measure only one space angle, it should be apparent that two orthogonal space angles can be simultaneously measured by employing a third antenna along a line orthogonal to the line joining the first two antennas, i.e. 10 and 12, and adjacent to the antenna 12 whose output is translated. A configuration similar to that illustrated in FIGURE 5 can then be employed to couple the third antenna to the antenna 12.

Although the preferred embodiment of the invention illustrated in FIGURE 5 is exceedingly useful in that it permits rapid electronic scanning while avoiding effects of nonlinear circuit components, its sensitivity unfortunately is somewhat reduced as compared to the embodiment of FIGURE 2. More particularly as a practical matter, the output signals provided by the antennas in FIGURE 5 will be somewhat attenuated by the distribution hybrid junctions, for example, and therefore the system of FIGURE 5 may be unsuitable for use in environments where the input signal energy is very weak. In view of this, attention is now called to the embodiments of FIGURES 7 and 8 which, it will be realized, attenuate the signals less and thus have a greater sensitivity than the system of FIGURE 5. The embodiments of FIGURES 7 and 8 will not however eliminate nonlinear effects to the extent the system of FIGURE 5 will. On the other hand, the embodiments of FIGURES 7 and 8 should provide measurements which are affected considerably less by nonlinearities than the embodiment of FIGURE 2.

The embodiments of FIGURES 7 and 8 are both based upon the realization that in any phase variable device (e.g. the translator of FIGURE 7 and the rotatable antenna of FIGURE 8), the amount of phase shift introduced can be most reliably determined at particular points in the period of the phase variable device. Stated otherwise, in a phase variable device where the amount of phase shift unfortunately does not vary linearly throughout the period of the device, a higher reliability can be attributed to some points in the period than other points. For example, in the translator embodiment of FIGURE 4, the amount of phase shift introduced when one modulator is completely on and the other completely off, can be much more precisely predicted than when the modulators are intended to contribute equally to develop a 45° phase shift. That is, there is a greater likelihood the phase shift will be inaccurate (less reliability) at 45° points where the effects of the modulators are intended to be balanced than at 90° points where one modulator is completely on and the other completely off. Although the translator of FIGURE 4 has been used for exemplary purposes, virtually all known phase variable devices have points of greater and lesser reliability. The embodiments of FIGURES 7 and 8 use a variable delay means such as a line stretcher to permit bearing angle measurements to be made at the points of highest reliability of the phase variable devices.

More particularly, the embodiment of FIGURE 7 is identical to the embodiment of FIGURE 2 except however a line stretcher 70 has been inserted in series with the output of the antenna 10, i.e. the antenna whose output is not translated. In the operation of the embodiment of FIGURE 7, assume initially that the line stretcher is at a $\delta=0$ position and the phase difference $\phi$ between the envelope (sum of translated signal from antenna 12 and nontranslated signal from antenna 10) and the translating signal is at some intermediate and unreliable point in the period of the translator. The line stretcher can then be adjusted to adjust $\phi$ to a point of high reliability in the translator period. The bearing angle can then be accurately determined on the basis of $\phi$ and $\delta$.

FIGURE 8 is similar to FIGURE 7 except however, it illustrates a rotary drive means 80 for driving a phasor antenna 82, in lieu of the previously described stationary antenna 12. As described in the aforecited patent, by rotating the antenna 82 with respect to a fixed reference antenna 84, the phase difference between the signals provided by the antennas 82 and 84 can be compared with a reference signal provided by rotary drive means 80 to provide the quantity $\phi$. By adjusting the line stretcher 86, the quantity $\phi$ can be adjusted to a high reliability point.

From the foregoing, it should be appreciated that several different embodiments of apparatus have been disclosed herein for determining the bearing angle or direction of a source of radiant energy from the apparatus. A significant feature of several of the embodiments resides in the utilization of an electronic scanning means in the form of a frequency translator. Another significant feature of several of the embodiments resides in the utilization of a variable delay means, such as a line stretcher, for the purpose of reducing inaccuracies introduced as a consequence of nonlinear characteristics of the phase variable devices employed.

What is claimed is:

1. Apparatus for determining the bearing angle relative thereto of a source of radiant energy comprising:
   first and second spaced antennas responsive to said radiant energy for respectively providing first and second output signals;
   translating means translating the frequency of only said first output signal unidirectionally in spectrum to develop a single translated signal;
   means responsive to said unidirectional translated signal and said second output signal for developing a first signal interference envelope, said translating means including means providing a reference signal; and
   signal utilization means for comparing the phase of said reference signal with the phase of said signal interference envelope as an indication of the bearing angle of the radiant energy source.

2. The apparatus of claim 1 wherein said translating means includes means providing a translating signal having a frequency much lower than the frequency of said radiant energy.

3. The apparatus of claim 1 wherein said means for developing said signal interference enevelope includes means for adding said translated and second output signals.

4. The apparatus of claim 1 including variable delay means located in the output in said first antenna for delaying said output signal relative to said translated signal.

5. The apparatus of claim 4 wherein said delay means comprises line stretching means.

6. The apparatus of claim 1 including a delay means:
   means applying said first output signal to said delay means to develop a delayed signal; and
   means responsive to said translated signal and said delayed signal for developing a second signal interference envelope.

7. The apparatus of claim 6 wherein said delay means includes means for varying the delay thereof to cause said second envelope to coincide in time with said first envelope.

8. The apparatus of claim 6 including calibration means for indicating the variation in delay required to cause said first and second envelopes to coincide.

9. The apparatus of claim 6 wherein said delay means comprises line stretching means.

10. Apparatus for determining the direction therefrom of a source of radiant energy comprising:
   first and second spaced antennas responsive to said radiant energy for respectively providing first and second output signals;
   means cyclically varying the phase of said first output signal only as a function of time to develop a phase varied signal;
   means responsive to said phase varied signal and said second output signal for developing a first signal interference envelope whose carrier frequency is substantially the same as the incoming energy;
   means for variably delaying said output signal from said first antenna relative to said phase varied signal;
   means for developing a reference signal from said means for cyclically varying the phase of said first output signal; and
   signal utilization means for comparing the phase of said first signal interference envelope with said reference signal as an indication of the bearing angle of the source of radiant energy.

11. Apparatus for determining the direction therefrom of a source of radiant energy comprising:
   first and second spaced antennas responsive to said radiant energy for respectively providing first and second output signals;
   means cyclically varying the phase of said first output signal as a function of time to develop a phase varied signal;
   means responsive to said phase varied signal and said second output signal for developing a first signal interference envelope;
   delay means delaying said first output signal to develop a delayed signal;
   means responsive to said phase varied signal and said delayed signal for developing a second signal interference envelope;
   means for generating a reference signal from said means for cyclically varying the phase of said first output signal; and
   signal utilization means for comparing the phasing of said first and second signal interference envelope with said reference signal.

12. The apparatus of claim 11 wherein said delay means includes means for varying the delay thereof to cause said second enevelope to coincide in time with first envelope.

13. The apparatus of claim 12 including calibration means for indicating the variation in delay required to cause said first and second envelopes to coincide.

14. The apparatus of claim 12 wherein said delay means comprises line stretching means.

15. The apparatus of claim 11 wherein said means varying the phase of said first output signal includes means for translating the frequency thereof.

References Cited

UNITED STATES PATENTS 2,951,152   8/1960   Sichak et al.

OTHER REFERENCES

Proceedings of the IRE, June 1956, pp. 755–760.

RODNEY D. BENNETT, *Primary Examiner.*

RICHARD E. BERGER, *Examiner.*

UNITED STATES PATENT OFFICE
CERTIFICATE OF CORRECTION

Patent No. 3,392,391

July 9, 1968

Douglas E. Royal

It is certified that error appears in the above identified patent and that said Letters Patent are hereby corrected as shown below:

Column 5, line 7, cancel "$V_1 V_s \cos w_s t$".

Signed and sealed this 20th day of January 1970.

(SEAL)
Attest:

Edward M. Fletcher, Jr.
Attesting Officer

WILLIAM E. SCHUYLER, JR.
Commissioner of Patents